US012724275B2

(12) United States Patent
Noori et al.

(10) Patent No.: US 12,724,275 B2
(45) Date of Patent: Sep. 1, 2026

(54) CAMERA CALIBRATION VERIFICATION USING HAND IMAGING AND PRODUCT PACKAGING

(71) Applicant: Google LLC, Mountain View, CA (US)

(72) Inventors: Narges Noori, Los Gatos, CA (US); Zhiheng Jia, Sunnyvale, CA (US); Zhaowei Wang, Stittsville (CA); Dao Zhou, Bothell, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 19/058,993

(22) Filed: Feb. 20, 2025

(65) Prior Publication Data

US 2025/0271673 A1 Aug. 28, 2025

Related U.S. Application Data

(60) Provisional application No. 63/557,316, filed on Feb. 23, 2024.

(51) Int. Cl.
*G02B 27/01* (2006.01)
*G06T 7/80* (2017.01)

(52) U.S. Cl.
CPC ............ *G02B 27/0172* (2013.01); *G06T 7/85* (2017.01); *G02B 2027/0138* (2013.01); *G02B 2027/0178* (2013.01); *G06T 2207/10012* (2013.01); *G06T 2207/30196* (2013.01)

(58) Field of Classification Search
CPC .......... G02B 27/017; G02B 2027/0138; G02B 2027/014; G06T 7/80
See application file for complete search history.

(56) References Cited

U.S. PATENT DOCUMENTS

| | | | |
|---|---|---|---|
| 2015/0256815 A1 | 9/2015 | Grafulla-gonzlez | |
| 2022/0067967 A1 | 3/2022 | Luo et al. | |
| 2022/0301304 A1* | 9/2022 | Hampali | G06N 3/045 |
| 2025/0180369 A1* | 6/2025 | Gurgul | G06Q 10/0838 |
| 2025/0238956 A1* | 7/2025 | Lee | G06T 7/11 |

FOREIGN PATENT DOCUMENTS

KR 102540560 B1 6/2023

OTHER PUBLICATIONS

"Box Measurement and Multi-Camera Calibration", Intel RealSense, Jan. 12, 2024, 4 pages.

(Continued)

*Primary Examiner* — Nelson M Rosario
(74) *Attorney, Agent, or Firm* — Brake Hughes Bellermann LLP

(57) ABSTRACT

Techniques are directed to identifying focus points of a body part of a user as alignment features for calibration verification. In some implementations, a body part of the user may be a hand, and the focus points are joints. A calibration verification involves, in some implementations, capturing an image of a user's hand and detecting the joints of the hand. The calibration verification then involves, in such implementations, determining distances between joints and computing a metric based on the distances. This metric is then compared to a ground truth metric and the calibration is evaluated based on the verification.

21 Claims, 5 Drawing Sheets

(56) References Cited

OTHER PUBLICATIONS

Lee, et al., "Camera-to-Robot Pose Estimation from a Single Image", https://arxiv.org/pdf/1911.09231.pdf, Apr. 23, 2020, 7 pages.
Pusztai, et al., "Accurate Calibration of Lidar-Camera Systems Using Ordinary Boxes", IEEE, https://openaccess.thecvf.com/content_ICCV_2017_workshops/papers/w6/Pusztai_Accurate_Calibration_of_ICCV_2017_paper.pdf, Jan. 15, 2024, 9 pages.
International Search Report and Written Opinion for PCT Application No. PCT/US2025/016742, mailed on Jun. 2, 2025, 12 pages.
Zhang, et al., "Automatic Calibration of the Fisheye Camera for Egocentric 3D Human Pose Estimation From a Single Image", 2021 IEEE Winter Conference on Applications of Computer Vision (WACV), 2021, pp. 1771-1780.

* cited by examiner

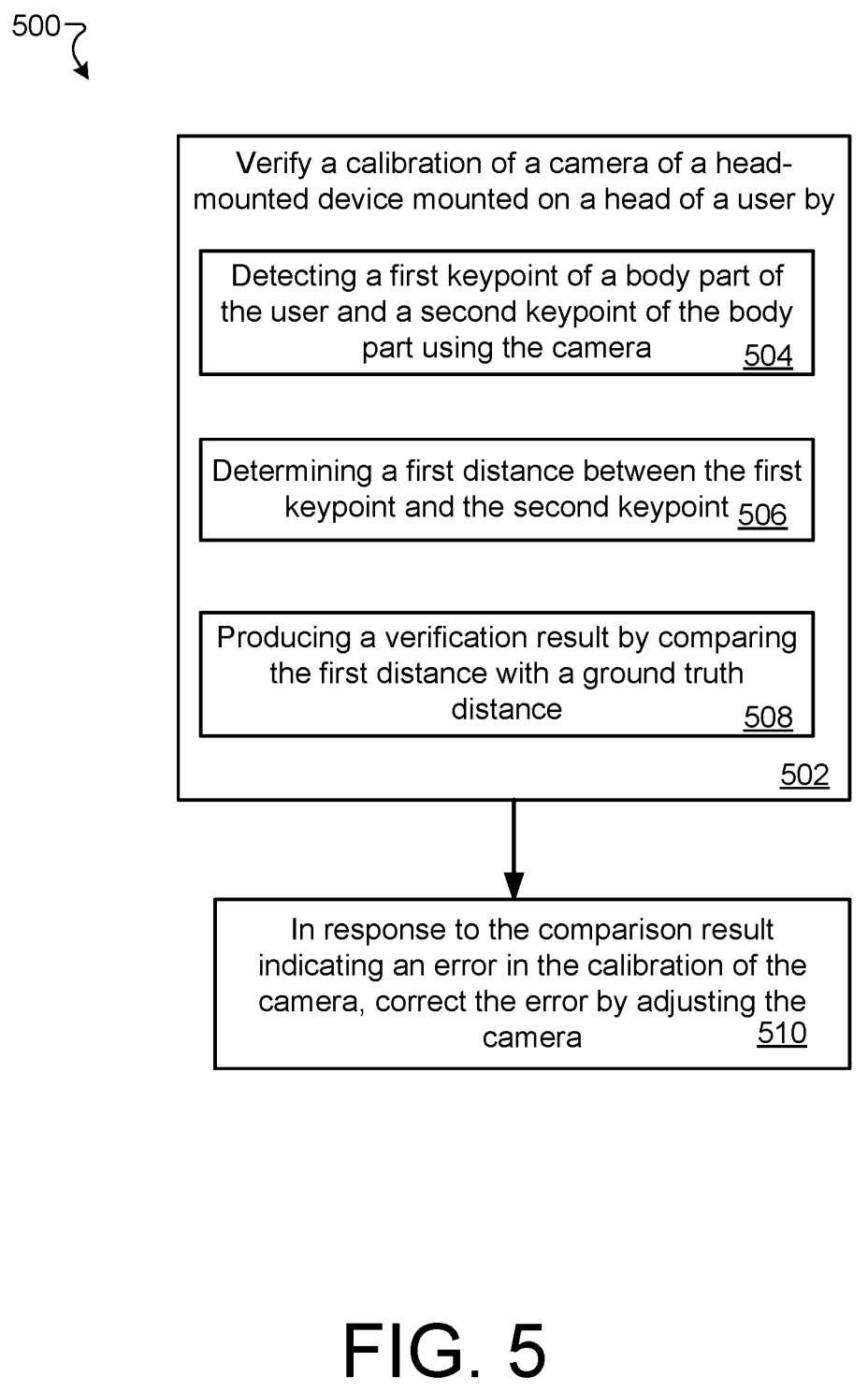

500

Verify a calibration of a camera of a head-mounted device mounted on a head of a user by Detecting a first keypoint of a body part of the user and a second keypoint of the body part using the camera 504

Determining a first distance between the first keypoint and the second keypoint 506

Producing a verification result by comparing the first distance with a ground truth distance 508

502

In response to the comparison result indicating an error in the calibration of the camera, correct the error by adjusting the camera 510

FIG. 5

CAMERA CALIBRATION VERIFICATION USING HAND IMAGING AND PRODUCT PACKAGING

CROSS-REFERENCE TO RELATED APPLICATION

This application claims priority to U.S. Provisional Patent Application No. 63/557,316, filed on Feb. 23, 2024, entitled "CAMERA CALIBRATION VERIFICATION USING HAND TRACKING AND PRODUCT PACKAGING", the disclosure of which is incorporated by reference herein in its entirety.

BACKGROUND

In the realm of wearable devices, ensuring accurate camera calibration enables delivery of optimal user experiences, particularly in applications involving augmented reality (AR) and virtual reality (VR). Camera calibration can be expensive, slow, cumbersome, and/or may not be able to adapt to changes in environmental conditions.

SUMMARY

Implementations described herein are related to improving the accuracy of world-facing cameras (e.g., visual see-through) on wearable devices (WDs), such as head-mounted devices (HMDs), during use. For example, such cameras may be used to generate images for augmented reality (AR) or extended reality (XR) systems. The accuracy of such cameras is important because inaccurately posed cameras can result in images that are misaligned in the displays of the WDs, which in turn can cause significant user discomfort. Such cameras may be calibrated in the factory prior to use by the user in order to set the cameras in the correct pose for aligned images. Nevertheless, the camera calibration may be disturbed during use, e.g., when the user touches the WD, as the WD ages, during changes in temperature and other environmental conditions, and when the WD is shipped from the factory to the user. Accordingly, during use of the WD, an WD system configured to operate the WD may verify the WD camera calibration using an alignment feature that has known dimensions. A convenient alignment feature is a body part of the user because the body part is always available. For example, a body part that may be used in such verification is the user's hand because the joints of the hands may be detected. In this case, to perform a verification, the WD camera captures an image of the user's hand. The WD system may analyze the image to estimate the positions of the joints of the user's hand. The WD system may then compute distances between certain joints of the hand (e.g., adjacent joints) and generate a metric (e.g., a ratio key performance indicator (KPI)). Such a KPI may then be compared to a ground truth KPI and, if there is a significant difference between the KPI and ground truth KPI, the camera calibration has become inaccurate and the WD camera may need adjusting, e.g., performing online calibration.

In one general aspect, a method can include verifying a calibration of a camera of a wearable device. The verification of the calibration of the camera may be performed by detecting a first focus point of a body part of the user and a second focus point of the body part using the camera, determining a first distance between the first focus point and the second focus point, and producing a verification result by comparing the first distance with a second distance. The method can also include, in response to the verification result indicating an error in the calibration of the camera, correcting the error by adjusting the camera.

In another general aspect, a computer program product comprising a nontransitory storage medium, the computer program product including code that, when executed by a processor, causes the processor to perform a method. The method can include verifying a calibration of a camera of a wearable device. The verifying of the calibration of the camera may be performed by detecting a first focus point of a body part of the user and a second focus point of the body part using the camera, determining a first distance between the first focus point and the second focus point, and producing a verification result by comparing the first distance with a second distance. The method can also include, in response to the verification result indicating an error in the calibration of the camera, correcting the error by adjusting the camera.

In another general aspect, an apparatus can include memory and a processor coupled to the memory. The processor can be configured to verify a calibration of a camera of a wearable device. The verifying of the calibration of the camera may be performed by detecting a first focus point of a body part of the user and a second focus point of the body part using the camera, determining a first distance between the first focus point and the second focus point, and producing a verification result by comparing the first distance with a second distance. The processor can also be configured to, in response to the verification result indicating an error in the calibration of the camera, correcting the error by adjusting the camera.

The details of one or more implementations are set forth in the accompanying drawings and the description below. Other features will be apparent from the description and drawings, and from the claims.

BRIEF DESCRIPTION OF THE DRAWINGS

FIG. 5 is a flow chart illustrating an example process of performing calibration verification, according to an aspect.

DETAILED DESCRIPTION

Figure 1:
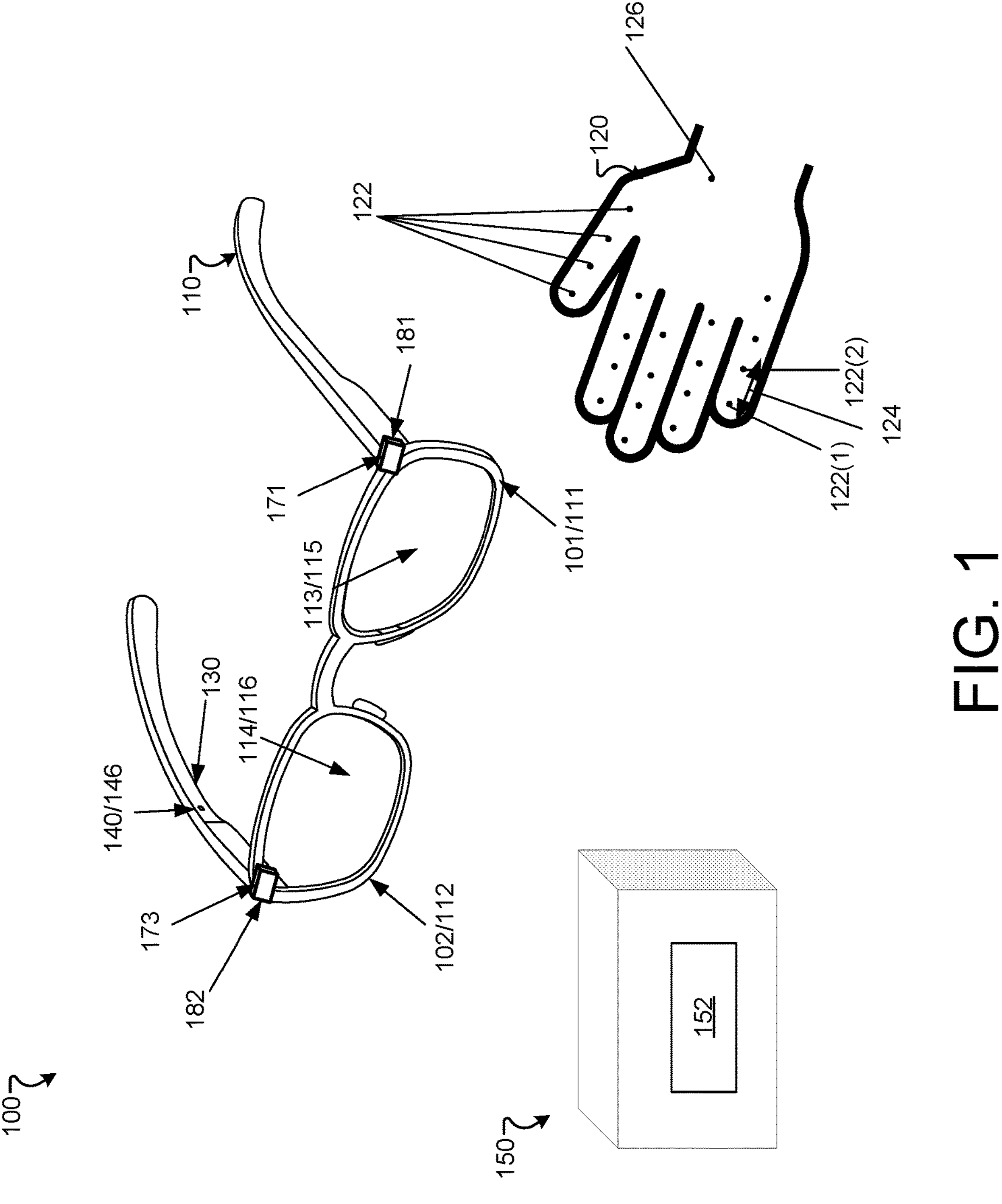
FIG. 1 is a diagram illustrating an example verification of a calibration of a wearable device camera, according to an aspect.

Calibration of cameras, e.g., a world-facing camera, on a wearable device (WD), such as augmented reality smart glasses or extended reality smart goggles, involves determining the parameter values of the camera that achieve images that are aligned with the displays. Such an alignment with the displays is desired because camera images that are out of sync with each other in the displays can cause discomfort for the user. Such parameters of the camera, e.g., calibration parameters can be intrinsic, e.g., focal length, defocus, tilt, etc., or extrinsic, e.g., 6DoF pose with respect to the display.

Calibration of the camera of a WD can be performed at the factory, prior to packaging. Such factory calibration has the advantage of being performed using sophisticated equipment without time pressure. Nevertheless, during use of the WD, the calibration of the camera can become degraded due to the user touching the WD, age of the WD, and temperature and other environmental conditions. Accordingly, calibration of the camera during use (online calibration) may become necessary at some point during the lifetime of the WD.

Alignment features can be used to improve online calibration of a camera in a WD. Alignment features are objects that are recognized by a WD system (e.g., processor of a WD) and have a known dimension. Such alignment features can assist with verification of the calibration of a camera, e.g., verifying whether the values of the calibration parameters of the camera are still in a range that produces acceptably aligned images in the display. For example, if some measure of the dimensions of the alignment features has changed significantly from some ground truth value, then the calibration of the camera has degraded and online calibration will need to be performed.

Conventional calibration verification with alignment features to improve camera calibration involves identifying alignment features on an external object with a known size. For example, such an external object may be a keyboard (e.g., laptop keyboard, desktop keyboard). Calibration verification would involve exploiting the known key sizes of keys on the keyboard. The keys on the keyboard with the known key sizes can be used as alignment features for verification of the calibration of one or more cameras of an WD.

A technical problem with the above-described conventional calibration verification that uses an external object as an alignment feature is the necessity of having such an external object such as a physical keyboard. Put another way, a user must have access to a keyboard and the keyboard must be present in front of the user, which limits the situations in which calibration verification can be performed and adds complexity to the calibration verification process. For example, not all keys are of the same size, so the user must not only have a physical keyboard but must also provide a type (make/model) of the laptop or keyboard to determine the alignment features or have access to a machine-learning algorithm to determine the type. The conventional calibration verification process cannot be used with an unknown type of keyboard or the absence of such a keyboard.

Disclosed implementations provide a technical solution to the problem of requiring an external object, such as a keyboard, for calibration of a wearable device worn by the user by identifying focus points of a body part of a user as alignment features for calibration verification. Focus points are predetermined points on the body part. These predetermined points may be identifiable using known or later developed detection techniques, e.g., hand tracking. In some implementations, a body part of the user may be a hand, and the focus points are joints. A calibration verification involves, in some implementations, capturing an image of a user's hand and detecting the joints of the hand. The calibration verification then involves, in such implementations, determining distances between joints and computing a metric based on the distances. This metric is then compared to a ground truth metric and the calibration is evaluated based on the verification.

In some implementations, a challenge with using joints of the user's hand involves resolving unknown body-joint scales so that the joint scales (distances) can be used as alignment features for calibration verification. Such implementations use joint detection already part of the wearable device in conjunction with a known size of an external object. In some implementations, the external object is packaging of the wearable device used to solve (identify) the joint scales. Once joint scales are solved, the joints can then be used as the alignment features. The joints may be hand joints. The joints may be finger joints. The joints can be part of any body part that the wearable device images. Thus, implementations operate nearly universally and do not require any equipment beyond the packaging of the wearable device at the time of unboxing the WD. The establishment of the alignment features (the joints) can be part of an out-of-box experience (OOBE), e.g., when a user first uses the wearable device after opening the packaging.

A technical advantage of the above-described technical solution is that, unlike the conventional calibration verification, the calibration verification can be performed at any time without requiring the user to have any specific external object such as a keyboard, which may not always be available. The ability to perform calibration verification of the WD camera at any time improves the functioning of the WD because the calibration will always be able to be set to the proper parameters, ensuring user comfort during use. The only time an external object is needed is at the OOBE, and at that point the external object (the packaging of the WD) is available by definition.

FIG. 1 is a diagram illustrating an example verification 100 of a calibration of a left camera 171 of an WD 110. As shown in FIG. 1, the WD 110 is a smart glasses device used for augmented reality (AR) and the left camera 171 is a world-facing camera. In some implementations, however, the WD 110 can be smart goggles used for extended reality (XR) and the left camera 171 is a visual see-through (VST) camera. Moreover, the right camera 173 may also be involved in the verification 100.

The WD 110 includes the left world-facing camera 171 with a left field of view (FOV) directed to an environment of a user. The WD 110 further includes the right world-facing camera 173 with a right FOV directed to the environment. The left FOV and the right FOV may overlap so that the left world-facing camera 171 and the right world-facing camera 173 can generate stereoscopic content of the environment. The left world-facing camera 171 includes a corresponding inertial measurement unit (IMU) 181 and the right world-facing camera 173 includes a corresponding IMU 182 configured to analyze motion in a frame of reference corresponding to each corresponding camera.

The WD 110 further includes a left display 113 and a right display 114. The left display 113 and the right display 114 are arranged so that they can be positioned in front of a user's eyes while the user is wearing the wearable device 110. The displays are configured to present stereoscopic content (i.e., images) to a user so that the user can perceive depth via the stereoscopic effect. The left display 113 is coupled to a left-display IMU 115 and the right display is coupled to a right-display IMU 116. The display IMUs 115 and 116 are rigidly coupled to the respective displays 113 and 114 so that movement of a display 113 or 114 is sensed by their respective IMU 115 or 116. Additionally, the IMUs 115 and 116 may be aligned with a coordinate system of the display so that a transformation between the frames of reference of the IMUs 115 and 116 can be equivalent to the transformation between the frames of reference of the displays 113 and 114.

The displays may be mechanically coupled to a positioner 130. The positioner 130 may be configured to move either (or both) displays. For example, a processor 140 of the wearable device 110 may control the positioner 130 to move a prescribed amount to create a spacing between the displays 113 and 114.

It may be desirable for the spacing between the displays 113 and 114 to approximate (e.g., equal) the spacing between a user's eyes (i.e., eye spacing). Accordingly, the wearable device 110 may include eye imaging cameras 101 and 102 which can help determine the eye spacing based on positions of eye features (e.g., pupil) in the eye images captured by the eye-imaging cameras 101 and 102. The wearable device 110 includes a left eye-imaging camera 101 having a left eye FOV directed to a left eye of the user and a right eye-imaging camera 102 having a right eye FOV directed to a right eye of the user. A left eye-imaging IMU 111 may be mechanically coupled to the left eye-imaging camera 101 and a right eye-imaging IMU 112 may be mechanically coupled to the right eye-imaging camera 102.

The wearable device 110 further includes a memory 146. The memory 146 may be a non-transitory computer-readable medium and may be configured to store instructions that, when executed by the processor 140, can configure the head-mounted device 110 to perform calibration verification. For example, the memory 146 may be configured to store ground truth distances for a user.

The wearable device 110 may further include a communication interface (not shown). The communication interface may be configured to communicate information digitally over a wireless communication link (e.g., WIFI, BLUETOOTH, etc.). For example, the wearable device 110 may be communicatively coupled to a network (i.e., the cloud) or a device (e.g., mobile phone) over the wireless communication link. The wireless communication link may allow operations of a computer-implemented method to be divided between devices and/or could allow for remote storage of the ground truth distances.

The ground truth distances may be acquired using the packaging 150 of the WD 110 at the time of out-of-box experience (OOBE). That is, when the user first takes the WD 110 out of the packaging 150, the user may be instructed to perform an initialization procedure on the WD. As part of the instructions, the user may be instructed to look at the packaging 150. The instruction may be given via printed instructions on, or accompanying, the packaging 150. The instruction may be given via audible instructions generated by the WD 110. The instruction may be given via a media presentation, such as a video or audio quick start guide available over the Internet. The packaging 150 is the retail packaging (box) designed by a manufacturer of the WD.

Because the packaging 150 is designed by the manufacturer, the packaging 150 may include a calibration portion 152. The calibration portion 152 is any portion of the packaging with predetermined size, or in other words, known dimensions. The calibration portion 152 may be the dimensions of the packaging. As shown in FIG. 1, the calibration portion 152 may be a pattern of known dimensions (a known size) on a surface of the packaging 150. In some implementations, the calibration portion 152 may be a pattern of known dimensions in an insert that comes with the packaging 150. The known dimensions (known size) may be used to correct for scale during intrinsic calibration and also to perform calibration verification.

Once the dimensions of the packaging 150 and/or the calibration portion 152 have been determined, the user may, as part of the instructions, place a hand 120 in front of the left world-facing camera 171. In some implementations, the user may be instructed that the hand 120 be placed proximate to (near, on, above, etc.) the calibration portion 152. The instruction may include an instruction for the body part to be positioned in a certain way, e.g., palm up, palm down, etc. When such positioning occurs close in time to the unboxing, it may be presumed that the camera calibration is good although the WD may have experienced some jostling during shipping after factory calibration. If the calibration portion is also in view when hand detection occurs, this presumption can be verified. Having verified good calibration (e.g., at the unboxing) using the packaging 150, the processor 140 of the WD 110 may detect joints of the body part. For example, the wearable device may include a hand detection module used for detecting gestures of the hand and this hand detection module can be used to detect the joints 122, including 122(1) and 122(2), and 126 of the hand 120. Although the hand 120 is given as an example, implementations can include detection of joints of another body part where the WD 110 includes a detection module for that body part.

The processor 140 of the WD 110 extracts a distance 124 between rigid adjacent joints 122(1) and 122(2). Rigid adjacent joints may be joints that align with physical bone. Rigid adjacent joints represent joint pairs where the distance between them does not change significantly (statistically) with movement (different gestures). The joint distances determined at the unboxing are referred to as ground truth distances. The ground truth distances can be used to determine metrics (key performance indicators (KPIs)), which may be used to verify calibration after the initialization procedure. Calculation of ground truth distances is discussed in more detail with respect to FIG. 2. The ground truth distances (and/or ground truth metrics generated using the ground truth distances) can thus be stored, e.g., in a memory, for later use.

During use at a later time (e.g., after the initialization procedure), the processor 140 of the WD 110 may cause a message to be displayed to the user to assist in performing the calibration verification. At this time, the user may place the hand 120 in front of the left world-facing camera 171. The processor 140 receives an image of the hand 120 and detects the joints 122, including 122(1) and 122(2), and 126. The processor 140 uses the stored dimensions of the calibration portion 152 to determine the distance between the joints 122(1) and 122(2). The processor 140 then forms a metric (KPI) using the distance and compares the distance to a stored ground truth distance. The processor determines the quality of the current calibration based on the verification.

Figure 2:
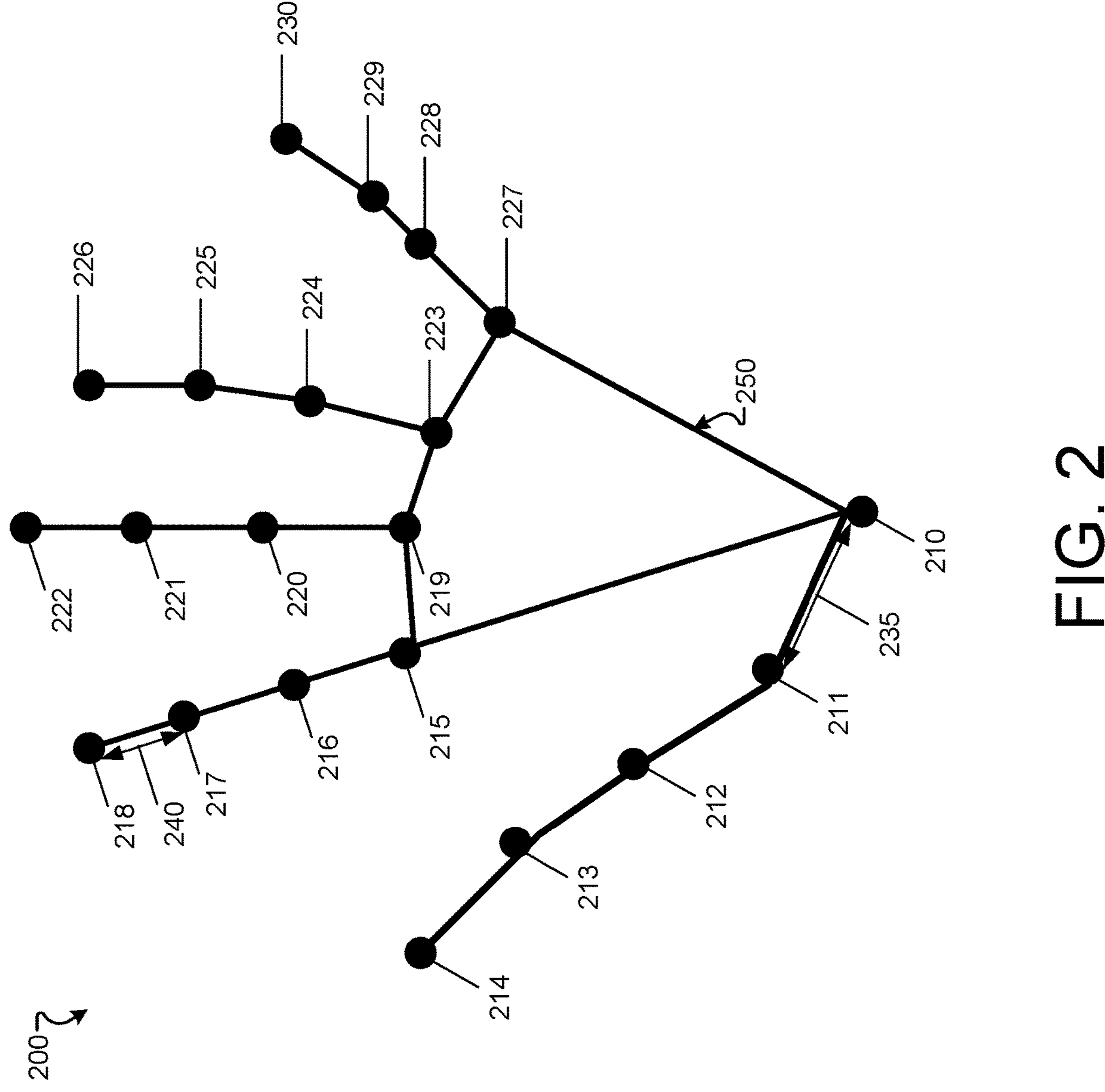
FIG. 2 is a diagram illustrating an example model of a human hand with joint locations, according to an aspect.

FIG. 2 is a diagram illustrating an example model 200 of a human hand with joints 210-230. In FIG. 2, the joints 210-230 of a human hand are pictured. In some implementations, joints 214, 218, 222, 226, and 230 are referred to as TIP; joints 213, 217, 221, 225, and 229 are referred to as TOP; joints 212, 216, 220, 224, and 228 are referred to as MID; and joints 211, 215, 219, 223, and 227 are referred to as BASE. Moreover, joint 210 is referred to as HAND. The distance between two sets of adjacent joints (e.g., i and j) in 3D space is determined, i.e., d(i,j). For example, adjacent pairs can be <TIP, TOP>, <TOP, MID>, <MID, BASE>.

Figure 4:
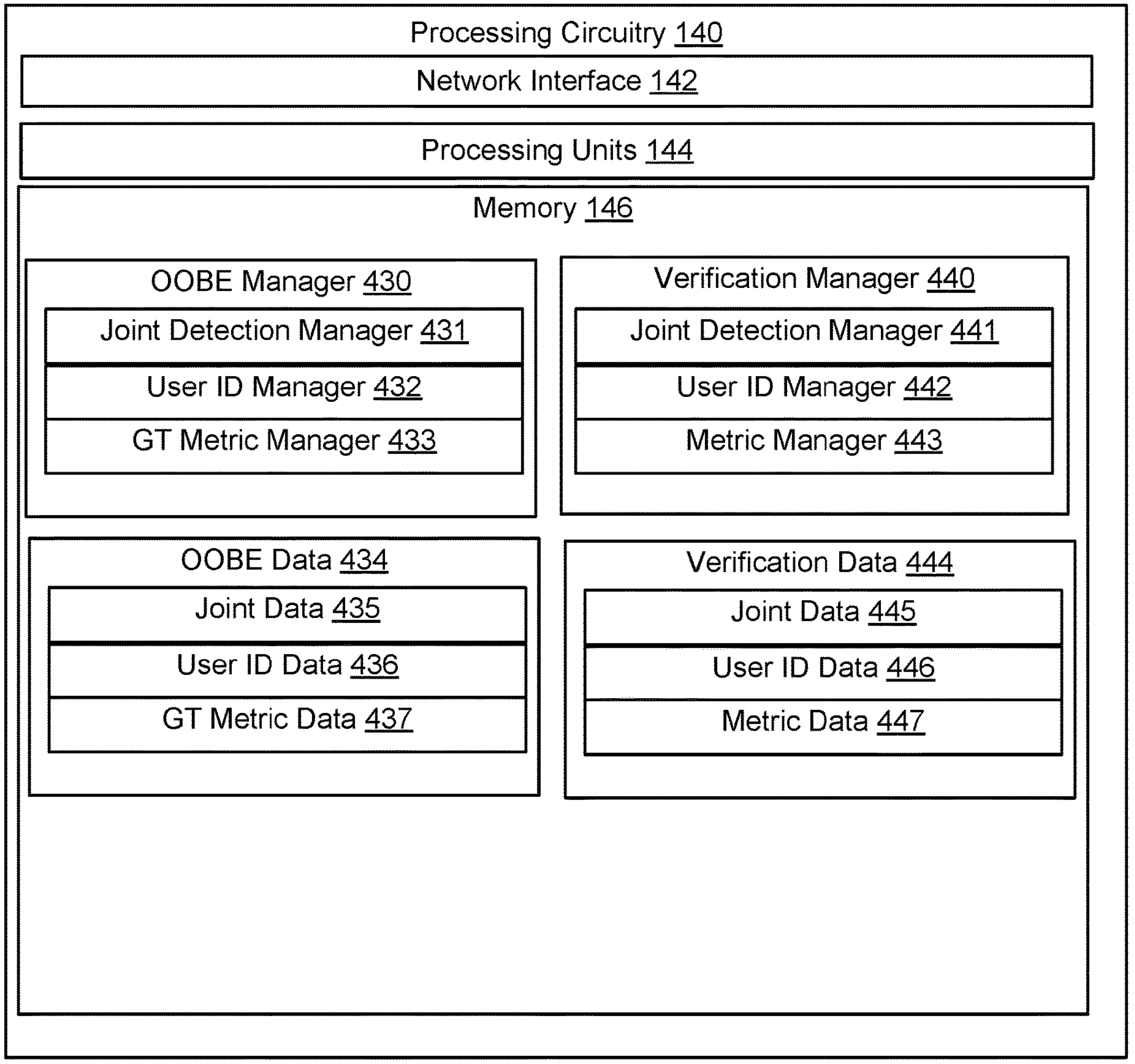
FIG. 4 is a diagram illustrating an example electronic environment in which the calibration verification may be performed, according to an aspect.

The distance between adjacent joints (e.g., distance 240 between joints 218 and 217 or the distance 235 between joints 210 and 211) is computed from estimated three-dimensional position determined by a joint detection manager (e.g., joint detection manager 431 in FIG. 4). In some implementations, the joint detection manager includes a model configured to predict two-dimensional positions of joint locations (e.g., joint locations in a 2D image). In some implementations, the model is a two-dimensional (2D) neural network. That is, an image of the hand may be input into the 2D neural network to produce, as output, positions of the joints in the image. Model fitting may then be used to fit a hand skeleton 250 and mesh to the predicted 2D joint locations from each view. The joint detection manager may then use these 2D joint locations and camera parameter values to triangulate the 2D joint locations to 3D poses. Such parameters of the camera, e.g., calibration parameters can be intrinsic, e.g., focal length, defocus, tilt, etc., or extrinsic, e.g., 6DoF pose with respect to the display. Assuming that the "identity/shape" part of the model remains the same, the distance between adjacent joint locations may remain the same.

At the time of initialization, the joint distances are stored as ground truth distances. At a later time, the distances can be calculated again and compared against the ground truth distances. The verification may result in performance statistics (KPIs). The performance statistics may include a standard deviation. The performance statistics may include a mean. If the statistics meet a variation threshold, the wearable device may need a calibration adjustment, e.g., using an online calibration process.

Figure 3:
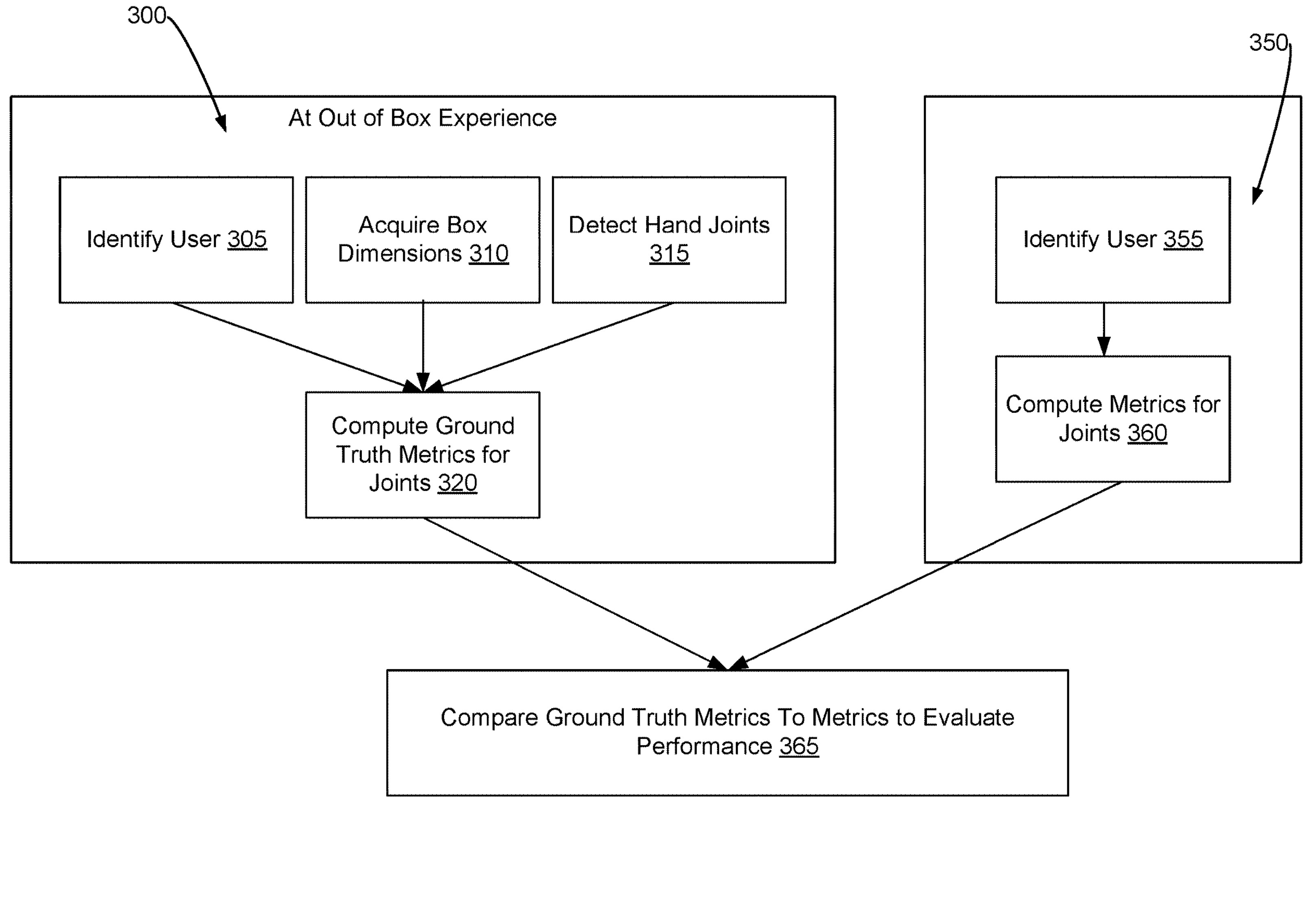
FIG. 3 is a diagram illustrating an example process of acquiring ground truth calibration metrics and performing calibration verification using those ground truth metrics, according to an aspect.

FIG. 3 is a diagram illustrating an example process of acquiring ground truth calibration metrics and performing calibration verification using those ground truth metrics. In FIG. 3, the initialization procedure 300 is illustrated. The initialization procedure 300 can be performed using a processor associated with an WD, such as the processor 140 of WD 110 of FIG. 1. The initialization procedure 300 uses packaging (e.g., packaging 150) for the WD as an aid in determining ground truth distances for joints. The joints from which the ground truth distances are derived are used as the alignment features.

At 305, the processor of the WD generates an identity of a user of the device. The processor of the WD may generate the identity the user using a user account (e.g., a login process). The processor of the WD may generate the identity of a user verifying a biometric attribute of the user. Biometric attributes include using the user's eye, e.g., via iris matching, using a user's hand, using a voiceprint, etc. Identification of the user may be part of device set-up at the out of the box experience (OOBE).

At 310 the user may be instructed to look at the packaging of the WD. The instruction may be given via printed instructions on, or accompanying, the packaging. The instruction may be given via audible instructions generated by the wearable device. The instruction may be given via a media presentation, such as a video or audio quick start guide available over the Internet. The packaging may be the retail packaging (box) designed by a manufacturer of the WD. Because the packaging is designed by the manufacturer, the packaging may include a calibration portion (e.g., calibration portion 152). The calibration portion is any portion of the packaging with known dimensions. The calibration portion may be the dimensions of the packaging. The calibration portion may be a pattern of known dimensions (a known size) on a surface of the packaging or in an insert that comes with the packaging. The known dimensions (known size) may be used to correct for scale during intrinsic calibration and also to verify the calibration. The known size can be used to determine whether the factory calibration is accurate. If the factory calibration is not accurate, the wearable device may perform an online calibration process before determining the joint scales. Having access to the packaging with a known size, calibration at this an initial timestamp (referred as TO or at OOBE) can be established as having sufficient accuracy.

At 315, the user may also be instructed to place a body part with joints in front of a camera of the WD (e.g., left world-facing camera 171). In some implementations, the user may be instructed that the body part, such as a hand, be placed proximate to (near, on, above, etc.) the calibration portion. The instruction may include an instruction for the body part to be positioned in a certain way, e.g., palm up, palm down, etc. When the instruction to place the body part occurs close in time to T0 (e.g., just after 310), it can reasonably be presumed that the camera calibration is acceptable. If the calibration portion is also in view when hand detection occurs, this assumption can be verified. Having verified good calibration (e.g., at T0 or OOBE) using the product packaging, the processor of the WD may detect the joints of the body part. For example, the processor of the WD may include a joint detection manager (e.g., joint detection manager 431 in FIG. 4) used for detecting gestures of the hand and this joint detection manager may be configured to detect the joints of the hand. Although a hand is given as an example, implementations can include detection of joints of another body part where the wearable device includes a detection module for that body part, e.g., a wrist.

At 320, the processor of the WD determines a distance between adjacent joints for one or more pairs of joints of the detected body part. Rigid adjacent joints may be joints that align with a physical bone. Rigid adjacent joints represent joint pairs where the distance between them does not change significantly (statistically) with movement (different gestures). The joint distances determined at TO or OOBE (e.g., as part of 320) are also referred to as ground truth distances. The ground truth distances can be used to determine statistics (KPIs), which may be used to verify calibration after initialization. The ground truth distances can be used to verify calibration after the initialization, e.g., verify calibration as part of validation procedure 350. The ground truth distances (and/or statistics generated using the ground truth distances) can thus be stored, e.g., in a memory (e.g., memory 146 of FIG. 1), for later use. The ground truth distances are associated with the user identified in 305. A different user of the wearable device may perform the procedure 300 so that ground truth distances can be calculated and stored for respective users. To get a baseline verification, from motion tracking cameras used by the joint detection manager, images from a calibration target may be taken. Using the extrinsic calibration between these motion tracking cameras, the processor of the WD may triangulate calibration dots and hence obtain a 3D estimation of the pose of the hand. The processor of the WD may then compute the distance between neighboring calibration dots and determine an error (e.g., standard deviation, mean) with respect to known distances. Such an error determination may provide a baseline for joint detection errors as well as a measure of how much of the error is coming from calibration.

In FIG. 3, a validation procedure 350 is illustrated. A validation procedure, such as procedure 350 may be used at any time after the initialization procedure 300. The validation procedure 350 may be performed while the user is using the device, e.g., after the initialization procedure 300 has been performed.

At 355, the processor of the WD identifies the user. This can be done in the same manner as described above with respect to 305.

At 360, the processor of the WD via a joint detection manager performs joint detection and extracts joint distances for joints on the body part (e.g., the hand) of the user. This procedure is the same procedure described above.

At 365 the joint distances and/or statistics generated from the joint distances are compared to the ground truth distances and/or statistics generated from the ground truth distances. The verification can result in calculation of a metric, such as mean and standard deviation or may use a statistic. The distances or metrics may be used to determine whether or not the WD has a calibration error condition. If the WD has a calibration error condition the camera may need an adjustment, e.g., a calibration adjustment accomplished via an online calibration process via adjustment of the calibration parameters. In some implementations, the validation procedure 350 may be used after an update to the WD to determine whether further calibration of the camera is needed.

FIG. 4 is a diagram illustrating an example electronic environment 400 in which the calibration verification may be performed. As shown in FIG. 4, the electronic environment includes the processor 140 of the WD 110 of FIG. 1.

The processor 140 includes a network interface 142, one or more processing units 144, and the (nontransitory) memory 146. The network interface 142 includes, for example, Ethernet adaptors, Bluetooth adaptors, and the like, for converting electronic and/or optical signals received from the network to electronic form for use by the processor 140. The set of processing units 144 include one or more processing chips and/or assemblies. The memory 146 is a storage medium and includes both volatile memory (e.g., RAM) and non-volatile memory, such as one or more read only memories (ROMs), disk drives, solid state drives, and the like. The set of processing units 144 and the memory 146 together form part of the processor 140, which is configured to perform various methods and functions as described herein as a computer program product. 140

In some implementations, one or more of the components of the processor 140 can be, or can include processors (e.g., processing units 144) configured to process instructions stored in the memory 146. Examples of such instructions as depicted in FIG. 4 include an OOBE manager 430 and a verification manager 440. Further, as illustrated in FIG. 2, the memory 146 is configured to store various data, which is described with respect to the respective managers that use such data.

The OOBE manager 430 is configured to generate ground truth measurements of either distance of metrics based on distance for calibration verification for cameras of the WD 110 during use. The OOBE manager 430 operates at the time of initialization or out-of-box experience and is configured to generate OOBE data 434. As shown in FIG. 4, the OBE manager 430 includes joint detection manager 431, user ID manager 432, and ground truth metric manager 433.

The joint detection manager 431 is configured to produce, as joint detection data 435, locations of the joints in an image captured by the camera whose calibration is being verified. For example, as part of the joint detection procedure, the user may place a body part with joints in front of a camera of the WD (e.g., left world-facing camera 171). In some implementations, the user may place the body part, such as a hand, proximate to a calibration portion of a box in which the WD was packaged. The box or calibration portion of the box has a known dimension stored in OOBE data 434. In some implementations, the joint detection managers stores the dimension of the box or calibration portion in the joint detection data 435. The user may position the body part in a certain way, e.g., palm up, palm down, etc. The joint detection manager 431 is configured to detect the joints of the body part, e.g., a hand.

The user ID manager 432 is configured to generate, as user ID data 436, a user identifier for the user whose joints are detected by the joint detection manager 431. The user ID manager 432 may be configured to identify the user using a user account (e.g., a login process). The user ID manager 432 may be configured to identify a user verifying a biometric attribute of the user. Biometric attributes include using the user's eye, e.g., via iris matching, using a user's hand, using a voiceprint, etc. Identification of the user may be part of device set-up at the OOBE.

The ground truth metric manager 433 is configured to compute, as ground truth metric data 437, ground truth distances between adjacent joints as identified in joint data 435. In some implementations, the dimension of the box or calibration portion stored in joint detection data 435 may be used to determine the joint scales for the ground truth distances. The ground truth distances can be used to determine statistics (KPIs), which may be used to verify calibration after initialization. The ground truth distances can be used to verify calibration after initialization. The ground truth distances (and/or statistics generated using the ground truth distances) are stored as GT metric data 437 for later use. The ground truth distances are associated with the user identifier stored in the user ID data 436. The OOBE manager 430 may generate ground truth distances and metrics for a different user of the WD so that ground truth distances can be calculated and stored for respective users. To get a baseline verification, from cameras used by the joint detection manager 431, images from a calibration target may be taken. Using the extrinsic calibration between these motion tracking cameras, the processor of the WD may triangulate calibration dots and hence obtain a 3D estimation of the pose of the hand. The processor of the WD may then compute the distance between neighboring calibration dots and determine an error (e.g., standard deviation, mean) with respect to known distances.

The verification manager 440 is configured to perform a calibration verification of a camera of an WD during use to produce verification data 444 indicating whether the calibration of the camera has an error. As shown in FIG. 4, the verification manager 440 includes a joint detection manager 441, a user ID manager 442, and a metric manager 443.

The joint detection manager 441 is configured to produce, as joint data 435, locations of the joints in an image captured by the camera whose calibration is being verified during use.

The user ID manager 442 is configured to determine an identifier of the user from one stored in the user ID data 436. For example, the user, during use, may have logged into a user account or used a biometric identifier (e.g., user's iris). The account or identifier data, stored in user ID data 446, is compared against the identifiers stored in user ID data 436. When an identifier is produced, the ground truth distances and metrics associated with that identifier are used for the verification.

The metric manager 443 is configured to generate, as metric data 447, distances between adjacent joints and metrics based on the distances. For example, the metrics are ratio KPI metrics, e.g., a ratio between a distance and a baseline distance. In some implementations, the baseline distance is a distance between the base joint of the hand (e.g., joint 210 of FIG. 2) and a base joint of the thumb (e.g., joint 211, the distance being distance 235). In some implementations, the dimension of the box or calibration portion stored in joint detection data 435 may be used to determine the joint scales for the distance.

The verification manager 440 is then configured to compare a distance stored in metric data 447 with a ground truth distance stored in ground truth metric data 437 associated with the user identifier. In some implementations, the verification manager 440 is configured to obtain a verification result by comparing metrics based on distance such as those described above. When the verification result indicates an error in the calibration, the calibration of the camera is updated by adjusting the camera, e.g., adjusting the calibration parameters of the camera. In some implementations, there is an indication of a calibration error in the verification when the verification satisfies a condition. For example, the condition may be that a difference between the distance and the ground truth distance or a difference between the metric and the ground truth metric is greater than a threshold. In some implementations, the threshold is 10% of the ground truth distance or ground truth metrics. The 10% figure, however, is not limiting and the threshold can be any percentage of the ground truth distance or ground truth metric or a number that is absolute, e.g., more than 5 mm.

The components (e.g., modules, processing units 144) of processor 140 can be configured to operate based on one or more platforms (e.g., one or more similar or different platforms) that can include one or more types of hardware, software, firmware, operating systems, runtime libraries, and/or so forth. In some implementations, the components of the processor 140 can be configured to operate within a cluster of devices (e.g., a server farm). In such an implementation, the functionality and processing of the components of the processor 140 can be distributed to several devices of the cluster of devices.

The components of the processor 140 can be, or can include, any type of hardware and/or software configured to process attributes. In some implementations, one or more portions of the components shown in the components of the processor 140 in FIG. 4 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the processor 140 can be, or can include, a software module configured for execution by at least one processor (not shown). In some implementations, the functionality of the components can be included in different modules and/or different components than those shown in FIG. 4, including combining functionality illustrated as two components into a single component.

Although not shown, in some implementations, the components of the processor 140 (or portions thereof) can be configured to operate within, for example, a data center (e.g., a cloud computing environment), a computer system, one or more server/host devices, and/or so forth. In some implementations, the components of the processor 140 (or portions thereof) can be configured to operate within a network. Thus, the components of the processor 140 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the search system can be, or can include, processors configured to process instructions stored in a memory. For example, OOBE manager 430 (and/or a portion thereof) and verification manager 440 (and/or a portion thereof) are examples of such instructions.

In some implementations, the memory 146 can be any type of memory such as a random-access memory, a disk drive memory, flash memory, and/or so forth. In some implementations, the memory 146 can be implemented as more than one memory component (e.g., more than one RAM component or disk drive memory) associated with the components of the processor 140. In some implementations, the memory 146 can be a database memory. In some implementations, the memory 146 can be, or can include, a non-local memory. For example, the memory 146 can be, or can include, a memory shared by multiple devices (not shown). In some implementations, the memory 146 can be associated with a server device (not shown) within a network and configured to serve the components of the processor 140. As illustrated in FIG. 4, the memory 146 is configured to store various data, including OOBE data 434 and verification data 444.

FIG. 5 is a flow chart illustrating an example process 500 of performing calibration verification. The process 500 may be carried out on a processor and memory such as processor 140 and memory 146 of FIGS. 1 and 4.

At 502, a verification manager, e.g., verification manager 440 verifies a calibration of a camera, e.g., left world-facing camera 171 of a wearable device (e.g., WD 110) worn by a user, using a verification result based on a body part of the user. The verification manager may perform the verification by performing the following.

At 504, the verification manager via a joint detection manager, e.g., joint detection detects a first focus point of a body part of the user and a second focus point of the body part using the camera. In some implementations, the body part is the user's hand, and the first and second focus points are joints of a finger.

At 506, the verification manager via a metric manager, e.g., metric manager 443 determines a first distance between the first focus point and the second focus point, e.g., between two adjacent joints. In some implementations, the metric manager further computes a metric based on the distance, e.g., a distance between the adjacent joints and a baseline distance. The metric may be defined to provide a more stable measure of the distance for verification with a ground truth metric. For example, defining the metric as a ratio of distance between rigid adjacent joints and a baseline distance may provide a verification that is less susceptible to noise. In some implementations, the baseline distance is a distance between a base joint of the hand an adjacent base joint of the thumb.

At 508, the verification manager produces a verification result by comparing the first distance with a second distance. In some implementations, the second distance is a ground truth distance, e.g., a distance between rigid adjacent joints measured at the initialization procedure or our-of-box experience. In some implementations, the verification result is a difference between the distance and the ground truth distance. In some implementations, the verification result is a difference between the metric and a ground truth metric, e.g., a ratio of the ground truth distance and the baseline distance.

At 510, in response to the verification result indicating an error in the calibration of the camera, the verification manager corrects the error by adjusting the camera. For example, the camera may be adjusted via an online calibration procedure for which the WD provides instructions. In some implementations, the online calibration procedure is an automatic procedure that adjusts the calibration parameter values of the camera via software. In some implementations, the online calibration procedure is manual with the user being required to perform adjustments to the calibration parameter values of the camera via a software application. In some implementations, there is an indication of an error in the verification result when the verification result satisfies a condition. For example, the condition may be that a difference between the distance and the ground truth distance or a difference between the metric and the ground truth metric is greater than a threshold. In some implementations, the threshold is 10% of the ground truth distance or ground truth metrics. The 10% figure, however, is not limiting and the threshold can be any percentage of the ground truth distance or ground truth metric or a number that is absolute, e.g., more than 5 mm.

Example 1. A method, comprising: verifying a calibration of a camera of a wearable device worn by a user by: detecting a first focus point of a body part of the user and a second focus point of the body part using the camera; determining a first distance between the first focus point and the second focus point; and producing a verification result by comparing the first distance with a second distance; and in response to the verification result indicating an error in the calibration of the camera, correcting the error by adjusting the camera.

Example 2. The method as in clause 1, wherein the method further comprises computing the second distance by: capturing an image of an object having a predetermined size with the camera; capturing an image of the body part with the camera; identifying the first focus point in the image of the body part and the second focus point in the image of the body part; and determining the second distance between the first focus point and the second focus point based on the image of the body part and the image of the object.

Example 3. The method as in clause 2, wherein the object is at least a portion of a box in which the wearable device was packaged.

Example 4. The method as in clause 1, wherein detecting the first focus point and the second focus point includes: capturing an image of the body part with the camera; and inputting the image into a model configured to produce, as output, a position of the first focus point within a frame of the body part and a position of the second focus point within the frame of the body part.

Example 5. The method as in clause 4, wherein the position of the first focus point is a first two-dimensional position and the position of the second focus point is a second two-dimensional position; and wherein the method further comprises: determining a three-dimensional position of the first focus point and a three-dimensional position of the second focus point based on the first two-dimensional position, the second two-dimensional position, and parameter values of the camera.

Example 6. The method as in clause 1, wherein the first focus point and the second focus point are adjacent joints of the body part.

Example 7. The method as in clause 1, wherein comparing the first distance with the second distance includes computing a ratio of the first distance and a baseline distance.

Example 8. The method as in clause 7, wherein the body part includes a hand, and wherein the baseline distance is a distance between a joint at a base of the hand and an adjacent joint of a finger of the hand.

Example 9. The method as in clause 1, wherein the body part includes a hand.

Example 10. The method as in clause 9, wherein the first focus point represents a first joint of a finger of the hand and the second focus point represents a second joint of the finger.

Example 11. The method as in clause 1, further comprising: generating an identity of the user; and verifying the calibration of the camera by verifying the identity of the user.

Example 12. A computer program product comprising a nontransitory storage medium, the computer program product including code that, when executed by a processor, causes the processor to perform a method, the method comprising: verifying a calibration of a camera of a wearable device worn by a user by: detecting a first focus point of a body part of the user and a second focus point of the body part using the camera; determining a first distance between the first focus point and the second focus point; and producing a verification result by comparing the first distance with a second distance; and in response to the verification result indicating an error in the calibration of the camera, correcting the error by adjusting the camera.

Example 13. The computer program product as in clause 12, wherein the method further comprises computing the second distance by: capturing an image of an object having a predetermined size with the camera; capturing an image of the body part with the camera; identifying the first focus point in the image of the hand and the second focus point in the image of the body part; and determining the second distance between the first focus point and the second focus point based on the image of the body part and the image of the object.

Example 14. The computer program product as in clause 13, wherein the object is at least a portion of a box in which the wearable device was packaged.

Example 15. The computer program product as in clause 12, wherein detecting the first focus point and the second focus point includes: capturing an image of the body part with the camera; and inputting the image into a model configured to produce, as output, a position of the first focus point within a skeleton of the body part and a position of the second focus point within the skeleton of the body part.

Example 16. The computer program product as in clause 15, wherein the position of the first focus point is a first two-dimensional position and the position of the second focus point is a second two-dimensional position; and wherein the method further comprises: determining a three-dimensional position of the first focus point and a three-dimensional position of the second focus point based on the first two-dimensional position, the second two-dimensional position, and parameter values of the camera.

Example 17. The computer program product as in clause 12, wherein the first focus point and the second focus point are adjacent joints of the body part.

Example 18. The computer program product as in clause 12, wherein comparing the first distance with the second distance includes computing a ratio of the first distance and a baseline distance.

Example 19. The computer program product as in clause 18, wherein the body part includes a hand, and wherein the baseline distance is a distance between a joint at a base of the hand and an adjacent joint of a finger of the hand.

Example 20. The computer program product as in clause 12, wherein the body part includes a hand.

Example 21. The computer program product as in clause 20, wherein the first focus point represents a first joint of the hand and the second focus point represents a second joint of the hand.

Example 22. The computer program product as in clause 12, wherein the method further comprises: generating an identity of the user; and verifying the calibration of the camera by verifying the identity of the user.

Example 23. An apparatus, comprising: a memory; and a processor coupled to the memory, the processor being configured to: verify a calibration of a camera of a wearable device worn by a user by: detecting a first focus point of a body part of the user and a second focus point of the body part using the camera; determining a first distance between the first focus point and the second focus point; and producing a verification result by comparing the first distance with a second distance; and in response to the verification result indicating an error in the calibration of the camera, correct the error by adjusting the camera.

Example 24. The apparatus as in clause 23, wherein the processor is further configured to compute the second distance by: capturing an image of an object having a predetermined size with the camera; capturing an image of the body part with the camera; identifying the first focus point in the image of the hand and the second focus point in the image of the body part; and determining the second distance between the first focus point and the second focus point based on the image of the body part and the image of the object.

Example 25. The apparatus as in clause 24, wherein the object is at least a portion of a box in which the wearable device was packaged.

In accordance with aspects of the disclosure, implementations of various techniques and methods described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A method, comprising:

computing a ground truth distance by capturing an image of an object having a predetermined size with a camera, the predetermined size being used to determine a scale of a body part;

verifying a calibration of the camera of a wearable device worn by a user by:

detecting a first focus point of the body part of the user and a second focus point of the body part using the camera;

determining a first distance between the first focus point and the second focus point; and producing a verification of the scale by comparing the first distance with the ground truth distance; and in response to the verification of the scale indicating an error in the calibration of the camera, correcting the error by adjusting the camera.

2. The method as in claim 1, wherein computing the ground truth distance includes:

capturing an image of the body part with the camera;

identifying the first focus point in the image of the body part and the second focus point in the image of the body part; and determining the ground truth distance based on the predetermined size of the object and a distance between the first focus point and the second focus point in the image of the body part.

3. The method as in claim 2, wherein the object is at least a portion of a box in which the wearable device was packaged.

4. The method as in claim 1, wherein detecting the first focus point and the second focus point includes:

capturing an image of the body part with the camera; and inputting the image into a model configured to produce, as output, a position of the first focus point within a frame of the body part and a position of the second focus point within the frame of the body part.

5. The method as in claim 4, wherein the position of the first focus point is a first two-dimensional position and the position of the second focus point is a second two-dimensional position;

wherein the method further comprises:

determining a three-dimensional position of the first focus point and a three-dimensional position of the second focus point based on the first two-dimensional position, the second two-dimensional position, and parameter values of the camera; and wherein determining the first distance between the first focus point and the second focus point includes:

computing a distance between the three-dimensional position of the first focus point and the three-dimensional position of the second focus point.

6. The method as in claim 1, wherein the first focus point and the second focus point are adjacent joints of the body part.

7. The method as in claim 1, wherein the body part includes a hand;

wherein comparing the first distance with the ground truth distance includes computing a ratio of the first distance and a baseline distance; and wherein the baseline distance is a distance between a joint at a base of the hand and an adjacent joint of a finger of the hand.

8. The method as in claim 1, further comprising:

generating an identity of the user; and verifying the calibration of the camera by verifying the identity of the user.

9. A computer program product comprising a nontransitory storage medium, the computer program product including code that, when executed by a processor, causes the processor to perform a method, the method comprising:

computing a ground truth distance by capturing an image of an object having a predetermined size with a camera, the predetermined size being used to determine a scale of a body part;

verifying a calibration of the camera of a wearable device worn by a user by:

detecting a first focus point of the body part of the user and a second focus point of the body part using the camera;

determining a first distance between the first focus point and the second focus point; and producing a verification of the scale by comparing the first distance with the ground truth distance; and in response to the verification of the scale indicating an error in the calibration of the camera, correcting the error by adjusting the camera.

10. The computer program product as in claim 9, wherein computing the ground truth distance includes:

capturing an image of the body part with the camera;

identifying the first focus point in the image of the body part and the second focus point in the image of the body part; and determining the ground truth distance based on the predetermined size of the object and a distance between the first focus point and the second focus point in the image of the body part.

11. The computer program product as in claim 10, wherein the object is at least a portion of a box in which the wearable device was packaged.

12. The computer program product as in claim 9, wherein detecting the first focus point and the second focus point includes:

capturing an image of the body part with the camera; and inputting the image into a model configured to produce, as output, a position of the first focus point within a skeleton of the body part and a position of the second focus point within the skeleton of the body part.

13. The computer program product as in claim 12, wherein the position of the first focus point is a first two-dimensional position and the position of the second focus point is a second two-dimensional position;

wherein the method further comprises:

determining a three-dimensional position of the first focus point and a three-dimensional position of the second focus point based on the first two-dimensional position, the second two-dimensional position, and parameter values of the camera; and wherein determining the first distance between the first focus point and the second focus point includes:

computing a distance between the three-dimensional position of the first focus point and the three-dimensional position of the second focus point.

14. The computer program product as in claim 9, wherein the first focus point and the second focus point are adjacent joints of the body part.

15. The computer program product as in claim 12, wherein the body part includes a hand;

wherein comparing the first distance with the ground truth distance includes computing a ratio of the first distance and a baseline distance; and wherein the baseline distance is a distance between a joint at a base of the hand and an adjacent joint of a finger of the hand.

16. The computer program product as in claim 9, wherein the method further comprises:

generating an identity of the user; and verifying the calibration of the camera by verifying the identity of the user.

17. An apparatus, comprising:

a memory; and a processor coupled to the memory, the processor being configured to:

compute a ground truth distance by capturing an image of an object having a predetermined size with a camera, the predetermined size being used to determine a scale of a body part;

verify a calibration of the camera of a wearable device worn by a user by:

detecting a first focus point of the body part of the user and a second focus point of the body part using the camera;

determining a first distance between the first focus point and the second focus point; and producing a verification of the scale by comparing the first distance with the ground truth distance; and in response to the verification of the scale indicating an error in the calibration of the camera, correct the error by adjusting the camera.

18. The apparatus as in claim 17, wherein the processor configured to compute the ground truth distance is further configured to:

capture an image of the body part with the camera;

identify the first focus point in the image of the body part and the second focus point in the image of the body part; and determine the ground truth distance based on the predetermined size of the object and a distance between the first focus point and the second focus point in the image of the body part.

19. The apparatus as in claim 18, wherein the object is at least a portion of a box in which the wearable device was packaged.

20. The apparatus as in claim 17, wherein the processor configured to detect the first focus point and the second focus point is further configured to:

capture an image of the body part with the camera; and input the image into a model configured to produce, as output, a position of the first focus point within a skeleton of the body part and a position of the second focus point within the skeleton of the body part.

21. The apparatus as in claim 20, wherein the position of the first focus point is a first two-dimensional position and the position of the second focus point is a second two-dimensional position;

wherein the processor is further configured to:

determine a three-dimensional position of the first focus point and a three-dimensional position of the second focus point based on the first two-dimensional position, the second two-dimensional position, and parameter values of the camera; and wherein the processor configured to determine the first distance between the first focus point and the second focus point is further configured to:

compute a distance between the three-dimensional position of the first focus point and the three-dimensional position of the second focus point.

* * * * *